Figures 1, 2:
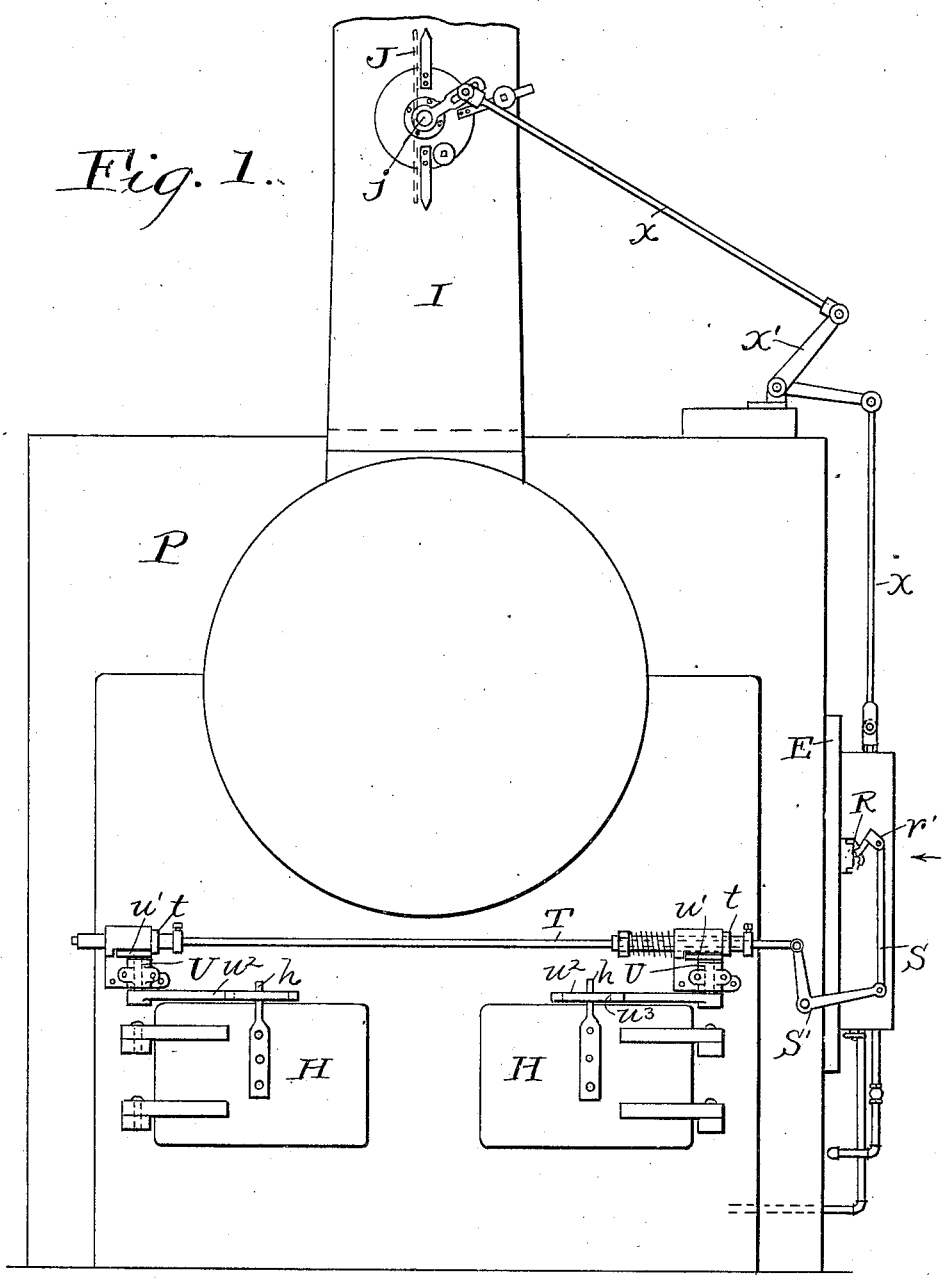

No. 828,411. PATENTED AUG. 14, 1906.
E. B. KIRBY.
AUTOMATIC REGULATOR DEVICE FOR STEAM BOILER FURNACES.
APPLICATION FILED JUNE 11, 1903.

5 SHEETS—SHEET 1.

Witnesses.
E. B. Gilchrist
N. L. Brennan

Inventor:
Edmund B. Kirby,
By his Attorneys,
Thurston & Bates.

No. 828,411. PATENTED AUG. 14, 1906.
E. B. KIRBY.
AUTOMATIC REGULATOR DEVICE FOR STEAM BOILER FURNACES.
APPLICATION FILED JUNE 11, 1903.

5 SHEETS—SHEET 2.

Witnesses
E. B. Gilchrist
N. L. Bresnan

Inventor
Edmund B. Kirby,
By his Attorneys
Thurston & Bates.

No. 828,411. PATENTED AUG. 14, 1906.
E. B. KIRBY.
AUTOMATIC REGULATOR DEVICE FOR STEAM BOILER FURNACES.
APPLICATION FILED JUNE 11, 1903.
5 SHEETS—SHEET 3.
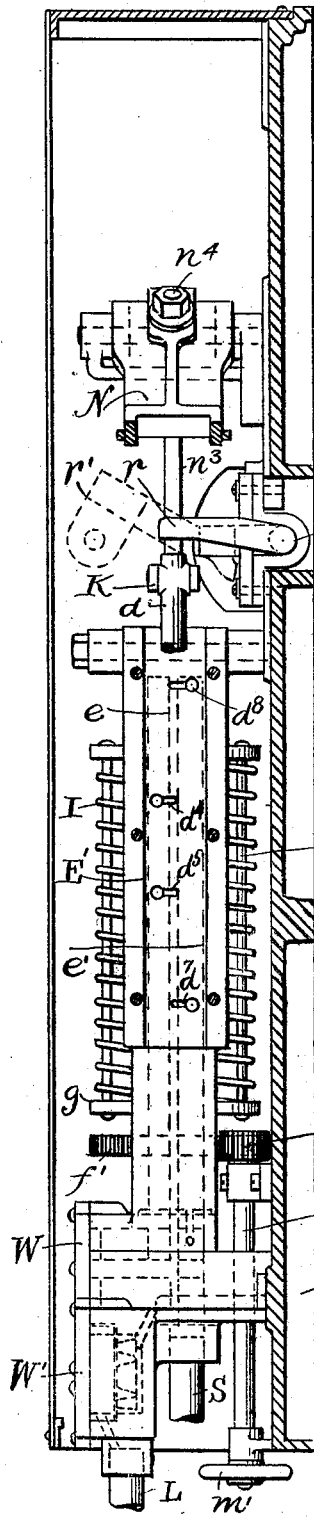
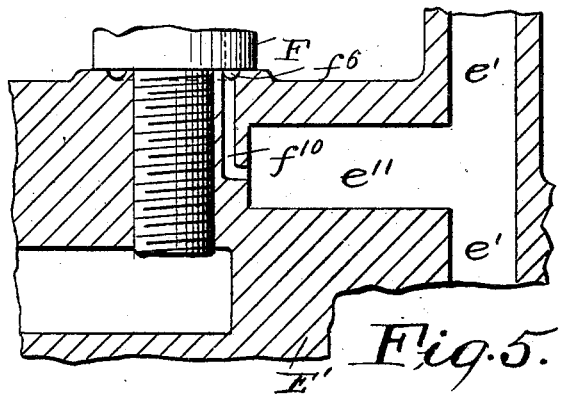
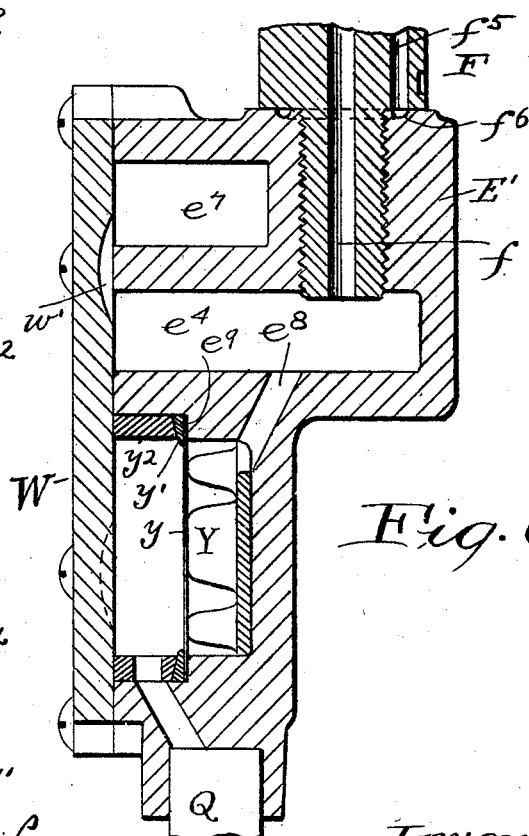
Witnesses.
E. B. Gilchrist
N. L. Brennan
Inventor.
Edmund B. Kirby,
By his Attorneys,
Thurston & Bates.

No. 828,411. PATENTED AUG. 14, 1906.
E. B. KIRBY.
AUTOMATIC REGULATOR DEVICE FOR STEAM BOILER FURNACES.
APPLICATION FILED JUNE 11, 1903.

6 SHEETS—SHEET 4.

Witnesses.
E. B. Filchust
N. L. Brennan.

Inventor:
Edmund B Kirby,
By his Attorneys,
Thurston & Bates.

No. 828,411. PATENTED AUG. 14, 1906.
E. B. KIRBY.
AUTOMATIC REGULATOR DEVICE FOR STEAM BOILER FURNACES.
APPLICATION FILED JUNE 11, 1903.

5 SHEETS—SHEET 5.

Witnesses.
E. B. Gilchrist
N. L. Brennan

Inventor:
Edmund B. Kirby,
By his Attorneys,
Thurston & Bates.

UNITED STATES PATENT OFFICE.

EDMUND B. KIRBY, OF ROSSLAND, CANADA.

AUTOMATIC REGULATOR DEVICE FOR STEAM-BOILER FURNACES.

No. 828,411.　　　　　Specification of Letters Patent.　　　　Patented Aug. 14, 1906.

Application filed June 11, 1903. Serial No. 160,980.

*To all whom it may concern:*

Be it known that I, EDMUND B. KIRBY, a citizen of the United States, residing at Rossland, in the Province of British Columbia and Dominion of Canada, have invented a certain new and useful Improvement in Automatic Regulator Devices for Steam-Boiler Furnaces, of which the following is a full, clear, and exact description, reference being had to the acompanying drawings.

This invention has for its object the automatic maintenance of substantially uniform steam-pressure in a steam-boiler. This result is attained by the proper automatic action of the furnace draft appliances.

The present invention relates to novel means for producing said automatic action, and is especially useful in connection with large apparatus where considerable power is required for operating the draft appliances. Said means include a fluid-motor by which the draft appliances are moved, a valve by which the movements of said motor are controlled, a fluid-pressure device operated by the boiler-pressure for moving said valve, and suitable connecting linkage by which the movements of said parts are properly coördinated. This is the primary invention; but the specific embodiment thereof, which is shown in the drawings and hereinafter described, includes many subordinate improvements which are also a part of the present invention, as definitely pointed out in the claims.

Figure 3:
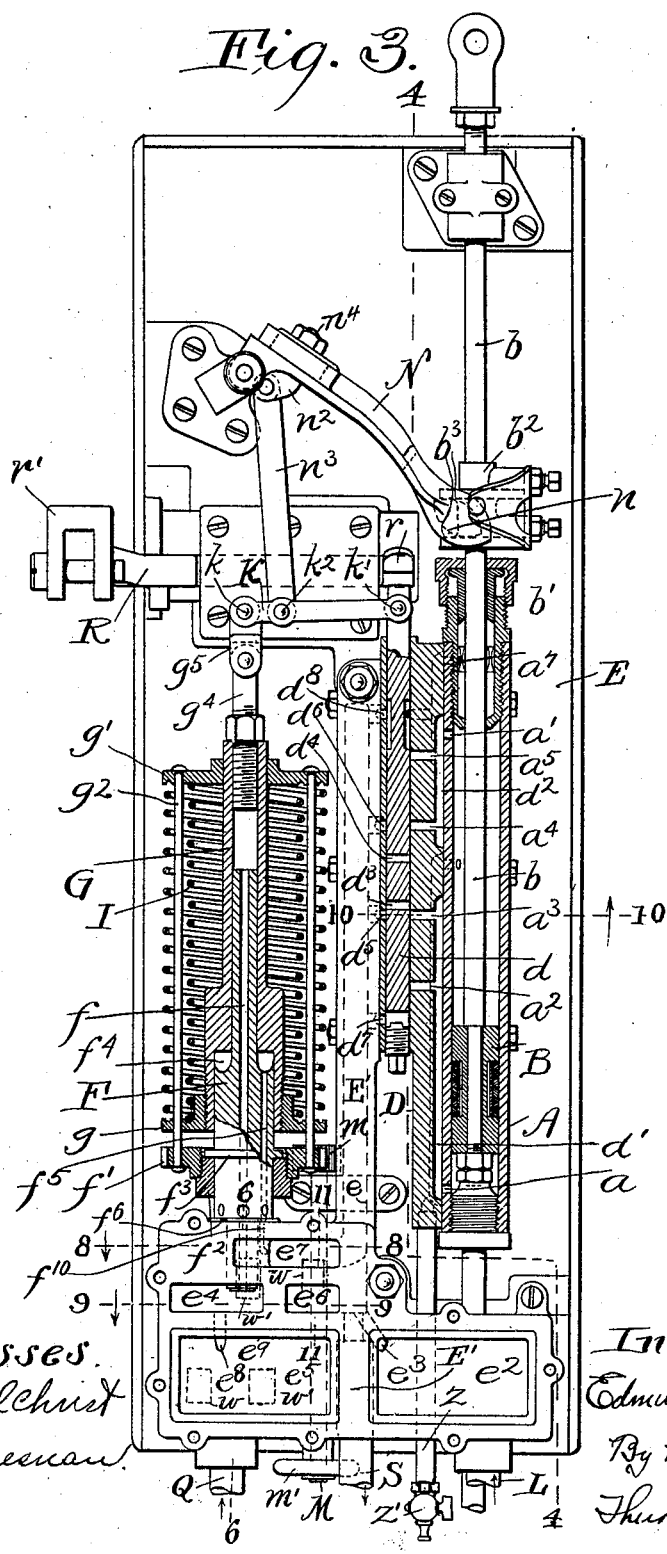
Figure 7:
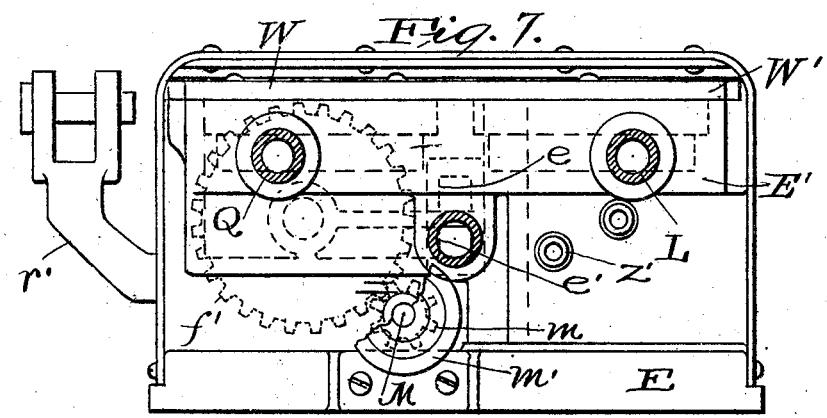
Figure 8:
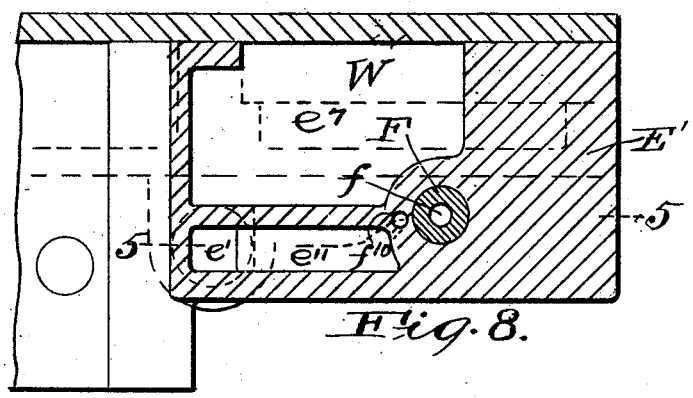
Figure 9:
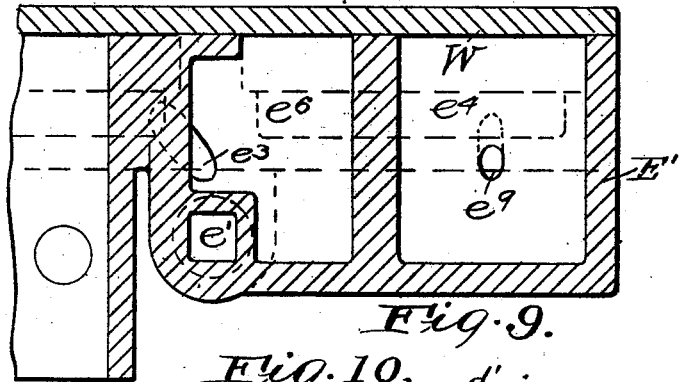
Figure 10:
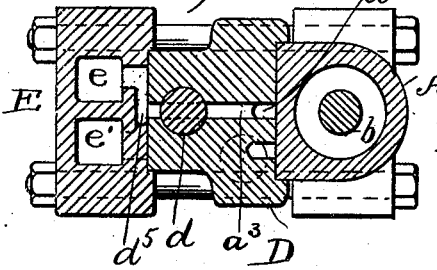
Figure 11:
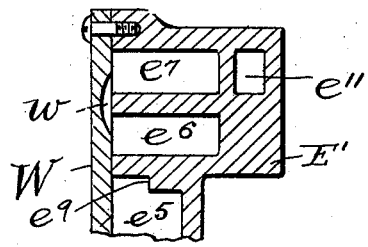
Figure 12:
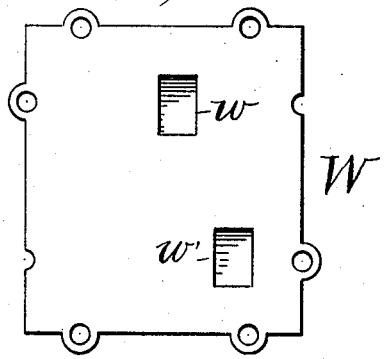
Figure 13:
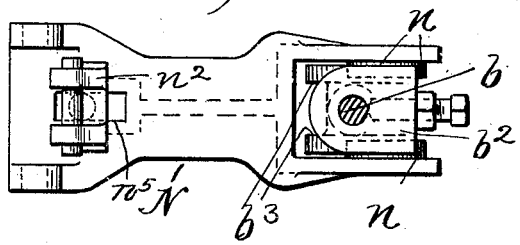

In the drawings, Figure 1 is a front elevation of a boiler-furnace equipped with the invention. Fig. 2 is a top plan view of the mechanism associated with the furnace-door shown at the right side of Fig. 1. Fig. 3 is a view, partly in vertical section, looking in the direction of the arrow of Fig. 1 at the base-block E and the mechanism supported thereon. Fig. 4 is a sectional view on the bent line 4 4 of Fig. 3, showing certain parts of the mechanism shown in Fig. 3. Fig. 5 is a vertical section in the plane indicated by line 5 5 of Fig. 8. Fig. 6 is a vertical section in the plane indicated by line 6 6 of Fig. 3. Fig. 7 is a bottom view of the mechanism shown in Fig. 3, and Figs. 8, 9, 10 are horizontal sectional views on lines 8 8, 9 9, and 10 10 of Fig. 3. Fig. 11 is a vertical sectional view in the plane indicated by line 11 11 of Fig. 3. Fig. 12 is a view of the inner side of the cover-plate W, and Fig. 13 is an under side view of the lever N and some associated parts. The arrows placed in juxtaposition with the section-lines referred to indicate the direction in which the section is viewed.

Referring to the parts by letters, P represents a steam-boiler furnace of any approved construction.

H represents the furnace-doors, I the flue or stack through which the products of combustion escape, and J a damper in said flue. While any suitable damper may be employed that shown is of the ordinary "butterfly" variety and has an outwardly-projecting stem or spindle $j$, which is connected by suitable power-transmitting mechanism with the fluid-motor. In the form shown this power-transmitting mechanism consists of a series of links $x$ and bell-levers $x'$, which will be readily understood from the drawings without further description. In fact, there is nothing of patentable novelty in the specific power-transmitting mechanism shown, and any other suitable mechanism for this purpose may be substituted.

The fluid-motor, the casing of its valve, and the fluid-pressure regulator are secured to and supported by a base-plate E, to which there is secured an irregularly-shaped block E', in which are numerous parts and chambers, all of which will be presently explained, and this plate E is to be fixed to a suitable support, as the furnace-wall, substantially as shown.

The fluid-motor employed is preferably a fixed cylinder A, in which is a movable piston B, whose piston-rod $b$ extends out through a suitable stuffing-box $b'$ in one end of the cylinder. It is to the upper end of this movable piston-rod that the power-transmitting mechanism referred to (the link $x$, as shown) is connected. Ports $a$ $a'$ lead from opposite ends of the cylinder into two longitudinal ports $d'$ $d^2$, which are grooves in the outer surface of a valve-casing D. This valve-casing is secured against the cylinder, so as to inclose said ports. Ports $a^2$, $a^3$, $a^4$, and $a^5$ are formed through the valve-casing, the two former being connected with the port $d'$ and the two latter with the port $d^2$. In this valve-casing is a longitudinally-movable balanced valve $d$, through which are the two inlet-ports $d^3$ $d^4$, which are adapted to be brought severally into alinement with the inlet-ports $a^3$ $a^4$, and thereby establish communication between these ports and the ports $d^5$ $d^6$, which extend through the opposite wall of the valve-casing and communicate with an inlet-passage $e$, formed in the block E'. There are two other ports $d^7$ $d^8$—exhaust-ports—which connect the valve-casing, near the ends thereof, with an exhaust-passage $e'$ in the same block E'. The passage $e$ is in open communication with the power fluid, which may be compressed air or any gas or steam from the boiler or water either from the boiler or from any other source of water-supply under pressure. In the construction shown provision is made for employing a power fluid taken from a source independent of the boiler, and when such fluid is employed it is delivered through a pipe L into a chamber $e^2$ in the block E', and from thence it passes through a port $e^3$ into a chamber $e^6$, thence through a port $w$ in cover-plate W, as shown in dotted lines in Fig. 3, into the chamber $e^7$, which communicates with the passage $e$. The passage $e'$, which is parallel with the passage $e$, is connected at its lower end with a pipe S, which serves as an exhaust-pipe and drain-pipe.

Any suitable fluid-pressure device connected with the boiler, so as to be operated by steam-pressure therein, may be employed. This device in the form shown in the drawings consists of a fixed piston F, which is rigidly fastened to the block E', this piston having a port $f$ extending entirely through it longitudinally. One end of this port is in communication with a chamber $e^4$ in the block E', and the other end of this port discharges into a movable cylinder G, which is fitted upon this fixed piston. A pipe Q connects the steam-space in the boiler with a chamber $e^5$, which chamber is connected with the chamber $e^4$ by a port $e^8$. There is therefore free communication between the steam-space of the boiler and the space inclosed by the piston and movable cylinder, so that the latter is always subject to the boiler-pressure, tending to move it upward. This movement, however, is resisted by a suitable spring or springs I. These springs are helical compression-springs which surround the cylinder and are compressed between a flange $g$, screwed on said cylinder, and a flange-collar $g'$, loosely embracing the same. This collar is connected by a series of rods $g^2$ to a disk $f''$, which is fastened to a collar $f^2$, which loosely embraces the piston-base lying below and in contact with a flange $f^3$ thereon. By turning this last-named disk $f''$ around the piston the collar $g'$ is also turned, and so, also, is the flange $g$, because the tie-rods $g^2$ pass loosely through it. The result is that the flange $g$ is caused to travel on the cylinder G, with the result of varying the tension of the springs. The disk $f''$ has external teeth, which mesh with a pinion $m$ on the upper end of a shaft M, which is mounted in the block E', and on the projecting lower end of the shaft M is a hand-wheel $m'$, whereby it may be turned. A rod $g^4$, which is screwed into the upper end of the cylinder G, serves as a plug-closure for the same. A short link $g^5$ is pivotally connected to the outer end of this plug, and to the outer end of this link one end of a lever K is pivotally connected by a pivot-pin $k$, while the other end of this lever is pivotally connected with the stem of valve $d$ by a pivot-pin $k'$. A swinging lever or arm N is pivoted to the base-plate E, and its free end has an operative connection with the piston-rod $b$. In the form shown a block $b^2$ is attached to this rod and has grooves $b^3$ on opposite sides. The free end of this lever N is forked, and the forks are provided with lugs $n$, which enter these grooves. Movement of the piston-rod $b$ is therefore necessarily accompanied by a corresponding movement of this lever. This lever near its pivot is connected by a link $n^3$ with the lever K, referred to, the connection with said lever K being by pivot $k^2$. The connection between the lever N and link $n^3$ is adjustable—that is to say, the link is connected with a block $n^2$, which is adjustable along said lever toward and from its pivot by means of the bolt $n^4$, passing through the slot $n^5$, and this furnishes means for properly adjusting the connected parts, so that through the described linkage the movements of the piston-rod $b$, the valve $d$, and the cylinder G will be properly coördinated.

The operation of the described mechanism is as follows: Until the steam-pressure reaches the desired minimum the parts are as shown in Fig. 3 and the damper J is open. An increase of steam-pressure in the boiler causes a proportionate movement of cylinder G in opposition to springs I. The upward movement of this cylinder causes the lever K to rock on the pivot $k^2$ as a fulcrum, and this causes the downward movement of the valve $d$. When this movement is a little greater than the lap of the valve, the inlet-ports $a^3$, $d^3$, and $d^5$ are brought into alinement and the power fluid is then admitted to the lower end of the power-cylinder. The result is that the piston will move up and will produce, through the mechanism described, a corresponding movement in the closing direction of the damper. The lever N will also be moved a proportionate distance, and this movement will be transmitted through the link $n^3$ to the lever K, with the result that this lever will rock upon the pivot $k$ as a fulcrum, and thereby the valve will move up and will close the inlet-ports, wherefore further movement of the piston B in the power-cylinder will be suspended until a further increase of steam-pressure in the boiler will cause a still further movement of the cylinder G, whereupon the described operations will be repeated, with the result of still further closing the damper. The lap of the valve in the particular construction shown is such that after the first movement of the power-piston in one direction—say in response to increased steam-pressure—each additional increase, whether large or small, causes a prompt additional movement of the power-piston in the same direction. Owing to the lap, however, the valve cannot change to the other set of ports unless the steam-pressure falls a certain amount fixed by the lap given—say, for illustration, one-half pound. Thus the power-piston and thereby the damper are relieved from unnecessary oscillations due to the minor oscillations of steam-pressure and respond only to its more important oscillations. By changing the lap of the valve the apparatus may be made to reverse to a reverse oscillation of, say, one pound, or one-half pound, or one-quarter pound in the steam-pressure, as desired. It will be understood that the closing of the damper will have the effect of checking the fire, so that at or before the maximum of steam-pressure desired is reached the fire will not cause any increase of steam-pressure in the boiler, but will rather allow the steam-pressure to decrease. The parts then work in the reverse direction for, say, each one-half pound decrease of pressure. The downward movement of the pressure-cylinder caused by the springs I when the steam-pressure is lowered will rock the lever K on pivot $k^2$ and move the valve up, thereby establishing communication between the upper end of the power-cylinder and the power fluid through ports $a^4$, $d^4$, and $d^6$, and as a result the piston in said power-cylinder will move down, thereby advancing the damper one step in the closing direction. The downward movement of the piston-rod will be transmitted through the linkage to the valve, with the result of moving the valve downward sufficiently to shut off communication between the power cylinder and the power fluid. It will be observed that when the power fluid is being admitted to either end of the cylinder A it is being discharged from the other end through one of the outlet-ports $a^2$ or $a^5$ around the corresponding end of the valve and through one of the ports $d^7$ $d^8$ into the exhaust-passage $e'$.

The described mechanism, as will be seen from the foregoing description, operates intermittently and whenever the steam-pressure increases or decreases a definite amount. As a result the damper is automatically opened or closed, as may be necessary to produce the desired results upon the fire. The proper operation of the device would, however, be interfered with and the apparatus be rendered worse than useless by the opening of the fire-doors for the purpose of firing the furnace if means were not provided for closing the damper in the flue whenever these fire-doors are opened, because if the damper remained open when the fire-doors are open a draft of cold air would rush into the furnace through said doors, would chill the fire, and would chill the boiler. The more the boiler was chilled the wider open the damper would be drawn, and therefore the greater the quantity of cold air which would flow. Thus the automatic mechanism hereinbefore described for governing the damper's positions would during the firings multiply the evil results due to opening the fire-doors, and the total result of the practical use of the described automatic regulating mechanism would be injurious rather than helpful. Means are therefore provided by which whenever the fire-doors are opened the valve $d$ is operated, so that the lower end of the power-cylinder is connected with the power fluid, and this connection is maintained until the damper has been entirely closed. The means provided consist of a rock-shaft R, mounted in the block E' and having one of its extended arms $r$ adapted to engage the upper end of the valve-stem $d$. At the other end of this rock-shaft there is a lever-arm $r'$, and between this lever-arm and a bar T, which is moved lengthwise by the furnace-doors, there is suitable power-transmitting mechanism consisting, preferably, of link S and lever S'. This rod T is mounted in a horizontal position over the doors, so as to be capable of moving endwise in suitable bearings. A vertical rock-shaft U, mounted on the furnace-front, has at its upper end a cam $u'$, adapted to engage a collar $t$ on this rod. On the lower end of this rock-shaft is an arm $u^2$, having a slot $u^3$, into which a finger $h$, attached to the fire-door, projects. Thus when the door is opened this rock-shaft U is necessarily turned, the cam $u'$ thereof moves the rod T lengthwise, and this movement, transmitted through the intermediate mechanism, rocks the rock-shaft R, and the arm $r$ thereof pushes the valve downward far enough to establish communication between the inlet-passage and the lower end of cylinder A, and the position of the valve is maintained so long as the furnace-door remains open, and as a result the piston B moves up and the damper is closed. During this movement of the piston and the consequent movement of the lever N the cylinder G will be moved up in opposition to the springs I, because the pivot $k'$ of the lever K is held stationary by the arm $r$. When the fire-doors are closed and this end of the lever K is permitted to move, the spring I will act to move the cylinder G downward. This movement, transmitted through the lever K to the valve, will move the valve upward until communication is established between the upper end of the cylinder A and the passage $e$. The piston B will then begin its downward movement, and since the lever N is concurrently moved the cylinder G will be permitted to move down until it reaches the position in which there will be a balance between the steam-pressure and the pressure of the springs I. In other words, the parts will automatically assume the position which they ought to occupy by reason of said steam-pressure.

The apparatus, as shown, is especially contrived with a view to employing a power fluid from a source independent of the boiler—such, for example, as water under service-pressure. It is desirable, however, that such an apparatus be capable of being used either with an independent power fluid or with steam or water under pressure of the boiler that is being regulated, and the various ports and chambers in the block E' are arranged, as shown, with special reference to adapting the apparatus to be used in either way. The open side of the chamber $e^2$ is closed by a cover-plate W'. A single cover-plate W, however, closes the tops of the chambers $e^4$ $e^5$ $e^6$ $e^7$. In the under side of this cover-plate are two curved ports $w$ $w'$, which are arranged so that when it is desired to use an independent power fluid the cover is put on in one way, in which event one of these ports $w$ establishes communication between the two chambers $e^6$ $e^7$, the other port being in that part of the cover which is over the chamber $e^5$, and therefore useless. The power fluid admitted to the chamber $e^2$ passes through the port $e^3$ into the chamber $e^6$, thence through this port $w$ into the chamber $e^7$ and thence into the inlet-passage $e$. If it is now desired to operate the power-cylinder by means of steam or water taken from the boiler, this cover-plate is removed and turned around one hundred and eighty degrees and then secured in place. When so secured, the other port $w'$ establishes communication between the chamber $e^4$ and the chamber $e^7$. When the parts are so connected, the steam or water from the boiler finds its way into the passage $e$ and thence, as occasion requires, into the cylinder, whereby to operate the piston B.

In order to preserve the parts against wear from impurities carried along by the steam and water, the two chambers $e^5$ and $e^4$ are equipped as filter-chambers. A grating Y is placed in each of these chambers, and a screen $y$ is supported upon this grating with its edge resting upon a ledge or shelf $e^9$ within said box. Some sort of packing $y'$ is placed upon this edge of this screen or upon this shelf, and a frame $y^2$ to hold the screen down is secured within the chamber upon this packing. The motor fluid is admitted in front of the screens in the chambers $e^2$ and $e^5$ through the pipes L and Q. From there they pass through the ports $e^8$ and $e^3$ from back of the screens to the ports and the chambers above.

The mechanism shown and heretofore described is a highly-organized specific embodiment of the generic invention. Provision is made for removing all leakage of the fluids from the motor, valve-casing, and pressure-regulator. Whatever leakage there may be between cylinder G and piston F of the pressure-regulator is caught in an annular groove $f^4$ in the top of the piston and escapes downward through port $f^5$ to an annular space $f^6$ between the end of piston and block E, and thence it escapes through a drilled hole $e^{10}$ into cored-out chamber $e^{11}$, which communicates with the exhaust-passage $e'$. Leakage between the valve and its casing escapes, through port $d^7$, into the same exhaust-passage $e'$. Leakage into the lower end of cylinder A escapes therefrom into port $d'$, which communicates with a drain-pipe Z, having a cock Z'. Leakage into the stuffing-box escapes through a port $a^7$ into a groove in the valve-casing, and thence into the exhaust-passage $e'$.

It will be understood that the generic invention herein described is not limited to any specific form of fluid-pressure regulator, nor to any particular form of fluid-motor adapted to operate the furnace-draft appliances, nor to any specific valve therefor; but on the contrary includes these three elements in any suitable form, when so connected by appropriate mechanism that their movements shall be coördinated substantially as hereinbefore specified.

Having described my invention, I claim—

1. In a boiler-furnace governor, the combination of the furnace, its draft appliance and boiler, with a fluid-pressure regulator operatively connected with the boiler, a power-cylinder, its piston and piston-rod, and mechanism connecting the latter with the draft appliance, a valve controlling the admission and escape of the power fluid to and from said cylinder, a lever pivoted to a fixed support and having an operative connection with the piston-rod, a lever pivotally connected with said valve and with the movable member of the regulator, a link pivoted at one end to said lever and a block, adjustably connected to the other lever, to which the other end of said link is pivotally connected, substantially as specified.

2. In a boiler-furnace governor, the combination of the furnace, its draft appliance and the boiler, with a fluid-pressure regulator provided with a movable member and connected with said boiler, a power-cylinder closed at both ends and having ports near both ends, an adjacent valve-casing having two longitudinal ports $d'$ $d^2$ with which said ports connect, said valve-casing having ports $a^2$, $a^3$ communicating with the port $d'$ and the ports $a^4$ $a^5$ communicating with the port $d^2$, a sliding valve in said casing containing the ports $d'$, $d^2$, said valve-casing containing two ports which connect with the fluid inlet-passage, and two other ports which connect with the fluid outlet-passage, a piston movable in said cylinder, its piston-rod, means operated by said rod for controlling the position of the draft appliance, and linkage connecting said piston-rod, valve and the movable member of the fluid-pressure regulator, substantially as specified.

3. In a boiler-furnace governor, the combination of a furnace, its draft appliance and boiler, with a fluid-pressure regulator provided with a movable member and operatively connected with the boiler, a fluid-motor operatively connected with the draft appliance, a valve for said motor, mechanism connecting the movable member of the regulator, the movable member of the motor and the valve, whereby their movements are coördinated, a casing for said motor and valve provided with a main inlet-passage therein for the power fluid for said motor, said casing being further provided with a steam-passage and with an independent passage, and means whereby said main passage may be connected either with the steam-passage or with the independent passage leading to another source of power-fluid supply, substantially as described.

4. In a boiler-furnace governor, the combination of a furnace, its draft appliance and boiler, with a fluid-pressure regulator provided with a movable member operatively connected with the boiler, a fluid-motor operatively connected with the draft appliance, a valve for said motor, mechanism connecting the movable member of the regulator, the movable member of the motor and valve, whereby their movements are coördinated, a casing for said motor and valve provided with a main inlet-passage therein for the power fluid for said motor, said casing being further provided with a steam-passage and with an independent passage, and a plate provided with suitable recesses in one face thereof, whereby when it is applied to the casing it may connect said main passage either with the steam-passage or with the independent passage leading to another source of power-fluid supply.

5. In a boiler-furnace governor, the combination of the furnace, its draft appliance, and boiler, with a fluid-pressure regulator in communication with the boiler, a fixed cylinder, its piston and piston-rod, a valve controlling the flow of the power fluid to and from said cylinder, mechanism connecting the piston-rod, valve and movable member of the regulator to coördinate their movements, mechanism controlled by said piston-rod for operating the draft appliance, and a block on which said cylinder, valve and regulator are supported, said block containing a filter-chamber adapted to be connected with an independent source of power fluid, a chamber with which said filter-chamber is connected by a port, an inlet-passage, a second filter-chamber adapted to be connected with the boiler, a chamber with which said filter-chamber is connected by a port, and which is connected with the fluid-pressure regulator, a cover-plate for closing the tops of the last-named filter-chamber and the other chambers mentioned, which cover contains in its under side ports by means of which the communication may be established either between the main inlet-passage and either of said filter-chambers, substantially as specified.

6. In a boiler-furnace governor, the combination of the furnace, its draft appliance, the furnace-door, and the boiler, with a fluid-pressure regulator operatively connected with the boiler, a fluid-motor operatively connected with the draft appliance, a valve for said motor, mechanism connecting the movable member of the regulator, the movable member of the motor and the valve to properly coördinate their movements, a rock-shaft having an arm adapted to engage with and move said valve, and mechanism intermediate of the furnace-door and rock-shaft whereby the latter is operated, substantially as specified.

7. In combination with a boiler-furnace having a draft appliance, of a cylinder having a piston therein, a rod for said piston connected with said draft appliance, a valve for admitting motor fluid to either side of said piston, another cylinder and piston relatively movable, a lever having a shifting fulcrum connected to the movable member thereof and also connected to said valve, a spring resisting the increasing force brought to bear upon said movable member and induced by the boiler-pressure, connections between said lever and said rod, whereby the movement of said member may operate said valve to actuate the piston of said rod and shift it, and whereby the shifting of said rod actuates the valve to shut off the motor fluid and prevent its further movement.

8. In combination with a boiler-furnace having a draft appliance, of a cylinder having a piston therein, a rod connected to said piston and also connected with the draft appliance, a valve for controlling the motor fluid to said cylinder, a relatively movable cylinder and piston, means for supplying the same with motor fluid, a compression-spring for resisting the movement of the movable member of said cylinder and piston, a lever connecting said member and said valve, an arm pivoted to a stationary part and having its free end connected to said rod, and a link connecting said arm and said lever whereby any change in pressure in the boiler may operate said rod to manipulate the draft appliance, and whereby the corresponding movement of said rod will operate said arm and move said lever in a manner to shift said valve and cut off the supply of pressure fluid to said rod-piston-operating cylinder.

9. In combination with a boiler-furnace having a draft appliance, a fluid-pressure cylinder having a piston provided with a rod for operating said draft appliance, a valve for controlling the supply of motor fluid to said cylinder, a piston mounted upon a stationary part, a relatively movable cylinder provided upon said piston, means for supplying pressure from the boiler to the piston-chamber, a lever connecting said cylinder to said valve, an arm pivoted at one end to a stationary part and having its free end engaging said rod, a link connected to said arm and to said lever, and a compression-spring for resisting the movement of said cylinder.

10. In combination with a boiler-furnace having a draft appliance and fuel-doors, of a cylinder having a piston provided with a rod for operating said draft appliance, a valve for controlling the supply of motor fluid to said cylinder, a relatively movable cylinder and piston, a compression-spring for resisting the motion of the movable member thereof, a lever connecting said movable member and said valve, connections between said lever and said rod whereby the movement of said member, caused by variations in the boiler-pressure, will operate said valve and actuate said rod, and whereby the actuation of said rod will shift said lever and the valve connected therewith to stop the movement of said rod, an arm arranged to engage a portion of said valve and shift the same to operate the rod to close the draft appliance, and connections between this arm and the fuel-doors.

11. In combination with a boiler-furnace having a draft appliance and fuel-doors, of a fluid-pressure cylinder having a piston provided with a rod connected to the draft appliance, a shiftable valve controlling the supply of motor fluid to said cylinder, a relatively movable cylinder, connections between the piston-chamber thereof and the boiler, a compression-spring arranged to resist the movement of the movable member of said cylinder and piston, a lever pivoted to said movable member and to said valve, connections between said lever and said rod whereby any variation in the boiler-pressure will shift said valve and operate the draft appliance, and whereby the continued operation of said rod will operate said lever and shift said valve to cut off the supply to said rod-piston-operating cylinder, a rock-shaft mounted on a stationary part, an arm secured to said shaft and engaging a portion of said valve, an operating-arm for rocking said shaft, connections between said arm and the fuel-doors whereby when the same are opened said valve will be shifted and the fluid-pressure will operate said rod-piston to cut off the draft to said furnace.

12. In combination with a boiler-furnace having a draft appliance, of a fluid-pressure cylinder having a piston provided with a rod connected with said draft appliance, a slidable valve for controlling the supply of motor fluid to said cylinder, a piston secured to a stationary part and connected with the boiler, a cylinder sliding on said piston, a lever connecting said cylinder and said valve, a compression-spring for resisting the movement of said cylinder, an arm pivoted at one end to a stationary part and at the other end connected to said rod, a link connected to said arm and to said lever, and means connected with the fuel-doors of the furnace for shifting said valve to operate the piston of said rod and close the draft appliance when said fuel-doors are opened.

13. In combination with a boiler-furnace having a draft appliance, a fluid-pressure cylinder having a piston provided with a rod connected with said draft appliance, a valve controlling the supply of motor fluid to said cylinder, a piston mounted in a stationary part and provided with ports connected with the boiler, a cylinder movable upon said piston, a flange secured to said cylinder, another flange loose upon said cylinder, a flange carried by said piston, connections between the loose flange upon said cylinder and said last-mentioned flange upon said piston, a spring interposed between the flange loose upon said cylinder and the flange secured to said cylinder, whereby any movement of the cylinder away from the piston will tend to further compress said spring, connections between said cylinder and said valve whereby any variation in the steam-pressure will be transmitted to said valve to operate the rod-piston and manipulate said draft appliance, and means coöperating with said connections and adapted to shift the said valve upon the continued movement of said rod.

In testimony whereof I hereunto affix my signature in the presence of two witnesses.

EDMUND B. KIRBY.

Witnesses:
C. V. JUBINS,
C. F. LARSEN.